(12) United States Patent
Hwang (10) Patent No.: US 7,735,103 B2
(45) Date of Patent: Jun. 8, 2010

(54) METHOD OF PROVIDING BROADCAST, METHOD OF REPRODUCING THE SAME, TERMINAL FOR THE SAME, AND SYSTEM THEREOF

(75) Inventor: Jae Moon Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 471 days.

(21) Appl. No.: 11/681,572

(22) Filed: Mar. 2, 2007

(65) Prior Publication Data
US 2007/0220549 A1     Sep. 20, 2007

(30) Foreign Application Priority Data
Mar. 3, 2006     (KR)     ...................... 10-2006-0020550

(51) Int. Cl.
*H04N 7/10* (2006.01)
*H04N 7/025* (2006.01)
*H04N 7/16* (2006.01)
*H04N 5/445* (2006.01)
*G06F 3/00* (2006.01)
*G06F 13/00* (2006.01)

(52) U.S. Cl. ............................. 725/41; 725/38; 725/32; 725/135

(58) Field of Classification Search .................. 386/35, 386/40, 92; 725/1–153
See application file for complete search history.

(56) References Cited

U.S. PATENT DOCUMENTS

| 6,160,950 | A | * | 12/2000 | Shimazaki et al. | ............ 386/46 |
| 7,031,317 | B2 | * | 4/2006 | Negishi et al. | ........... 370/395.2 |
| 7,054,539 | B2 | * | 5/2006 | Ito et al. | ........................ 386/46 |
| 2002/0059571 | A1 | * | 5/2002 | Negishi et al. | .................. 725/1 |
| 2002/0197053 | A1 | * | 12/2002 | Nakamura et al. | ............. 386/35 |
| 2003/0072558 | A1 | * | 4/2003 | Miyasato et al. | .............. 386/83 |
| 2003/0093790 | A1 | * | 5/2003 | Logan et al. | ................... 725/38 |
| 2005/0204385 | A1 | * | 9/2005 | Sull et al. | ...................... 725/45 |
| 2006/0130119 | A1 | * | 6/2006 | Candelore et al. | ........... 725/135 |

* cited by examiner

*Primary Examiner*—Christopher Kelley
*Assistant Examiner*—Justin E Shepard
(74) *Attorney, Agent, or Firm*—Lee, Hong, Degerman, Kang & Waimey

(57) ABSTRACT

A method of providing a broadcast, method of reproducing the same, terminal for the same, and system thereof are disclosed, by which recorded broadcast data can be summarized and reproduced according to contents or priority of the broadcast. The present invention includes a broadcasting station inserting a summary reproduction information in broadcast data, transmitting the broadcast data; and a broadcast terminal storing the broadcast data received from the broadcasting station, reproducing a summary of the broadcast data using the summary reproduction information.

15 Claims, 6 Drawing Sheets

METHOD OF PROVIDING BROADCAST, METHOD OF REPRODUCING THE SAME, TERMINAL FOR THE SAME, AND SYSTEM THEREOF

This application claims the benefit of the Korean Patent Application No. 10-2006-0020550, filed on Mar. 3, 2006, which is hereby incorporated by reference as if fully set forth herein.

BACKGROUND OF THE INVENTION

1. Field of the Invention

The present invention relates to digital broadcasting, and more particularly, to a method of providing a broadcast, method of reproducing the same, terminal for the same, and system thereof. Although the present invention is suitable for a wide scope of applications, it is particularly suitable for reproducing a summary of the broadcast.

2. Discussion of the Related Art

Generally, the latest technical developments of digital broadcasting bring various digital broadcasting specifications. So, a variety of broadcast terminals have been provided to receive broadcasts according to the respective broadcasting specifications.

For instance, the digital broadcasting specifications include Eureka-147 based DAB (digital audio broadcasting) in EU, DVB-H (digital video broadcasting-handheld) by Qualcomm in U.S.A., DMB (digital multimedia broadcasting) in Korea, etc.

A user watches various broadcast programs using a broadcast terminal and is able to record a currently watched broadcast program.

However, since the related art broadcast terminal is not equipped with a function of summarizing to play an important part and contents of the recorded broadcast program, the user should watch a whole part of the recorded broadcast program to apprehend the contents of the recorded broadcast program.

SUMMARY OF THE INVENTION

Accordingly, the present invention is directed to a method of providing a broadcast, method of reproducing the same, terminal for the same, and system thereof that substantially obviate one or more problems due to limitations and disadvantages of the related art.

An object of the present invention is to provide a method of providing a broadcast, method of reproducing the same, terminal for the same, and system thereof, by which recorded broadcast data can be summarized and reproduced according to contents or priority of the broadcast.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of providing a broadcast according to the present invention includes the steps of inserting a summary reproduction information in the broadcast data and transmitting the broadcast data having the summary reproduction information.

Preferably, the broadcast data is BIFS (binary format for scenes).

Preferably, the summary reproduction information includes attribute values of scenes of the broadcast data.

More preferably, the attribute values indicate levels of contents or priorities of the scenes.

More preferably, the summary reproduction information is inserted in an adaptation field of the BIFS.

In another aspect of the present invention, a method of reproducing a broadcast includes the steps of receiving and storing the broadcast data containing a summary reproduction, analyzing the stored the summary reproduction information, and reproducing a summary of the broadcast data using the analyzed summary reproduction information.

Preferably, the broadcast data is BIFS (binary format for scenes).

Preferably, attribute values of scenes of the broadcast data are included in the summary reproduction information.

More preferably, the attribute values indicate levels of contents or priorities of the scenes.

Preferably, the summary reproducing step includes the steps of checking whether the attribute values included in the analyzed information meet a preset summary reproduction condition, detecting audio/video data linked to the scene of the broadcast data if the preset summary reproduction condition is met, and reproducing the summary by buffering the detected audio/video data.

More preferably, the summary reproduction condition includes a value set by a user for a level of a content or priority of the broadcast data.

Preferably, the summary reproduction information is inserted in an adaptation field of BIFS.

In another aspect of the present invention, a broadcast terminal includes a broadcast receiving unit receiving broadcast data containing a summary reproduction information, a storage unit storing the broadcast data received by the broadcast receiving unit, and a control unit reproducing a summary of the broadcast data stored in the storage unit using the summary reproduction information.

Preferably, the broadcast data is BIFS (binary format for scenes).

Preferably, the control unit analyzes attribute values of scenes of the broadcast data included in the summary reproduction information.

More preferably, the attribute values indicate levels of contents or priorities of the scenes.

Preferably, if an attribute value included in the a summary reproduction information meets a preset summary reproduction condition, the control unit reproduces a summary of the broadcast data by detecting and buffering audio/video data linked to scenes of the broadcast data.

More preferably, the summary reproduction condition includes a value set by a user for a level of a content or priority of the broadcast data.

Preferably, the summary reproduction information is inserted in an adaptation field of BIFS.

In another aspect of the present invention, a broadcast system includes a broadcasting station inserting a summary reproduction information in broadcast data, transmitting the broadcast data having the summary reproduction information; and a broadcast terminal storing the broadcast data received from the broadcasting station, reproducing a summary of the broadcast data using the summary reproduction information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First of all, a method of providing a broadcast, method of reproducing the same, terminal for the same, and system thereof according to the present invention are applicable to various digital broadcasting specifications.

And, the digital broadcasting specifications include Eureka-147 based DAB (digital audio broadcasting) in EU, DVB-H (digital video broadcasting-handheld), MediaFLO by Qualcomm in U.S.A., DMB (digital multimedia broadcasting) in Korea, etc. for example.

Details of the respective digital broadcasting specifications are omitted in the following description.

And, a broadcast terminal according to the present invention corresponds to a terminal capable of receiving various digital broadcasts such as a PDA, a PMP, a mobile phone, a smart phone, a digital TV, a game player, etc.

In the following description, a method of providing a broadcast, method of reproducing the same, terminal for the same, and system thereof according to the present invention are explained with reference to DMB. Yet, a scope of the present invention is not limited to the DMB.

Figure 1:
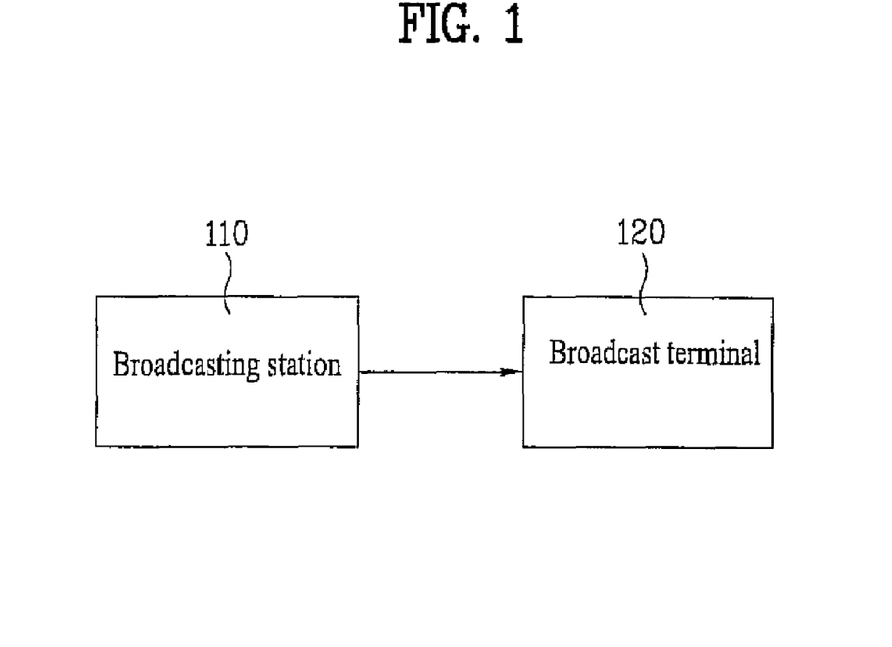
FIG. 1 is a block diagram of a broadcast system according to one embodiment of the present invention.

FIG. 1 is a block diagram of a broadcast system according to one embodiment of the present invention.

Figure 2:
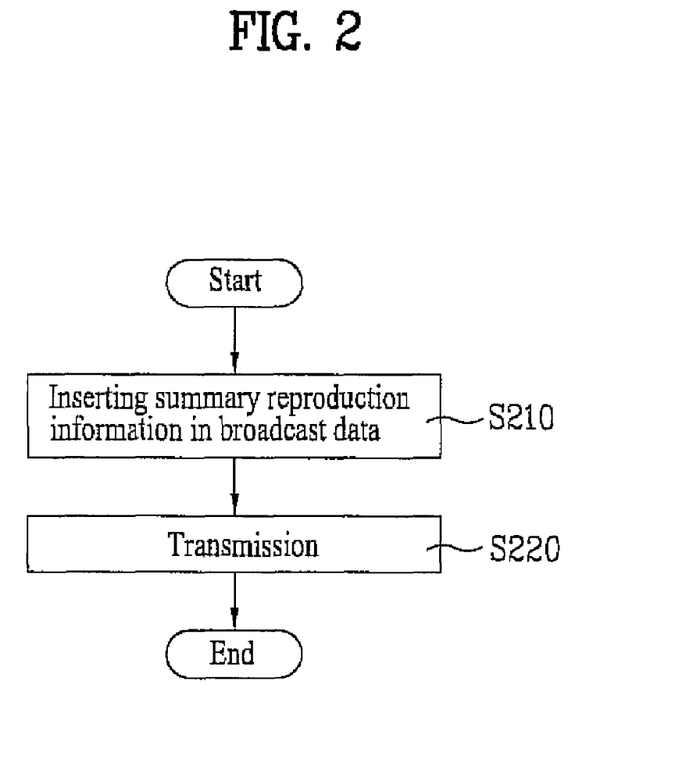
FIG. 2 is a flowchart of a method of transmitting broadcast data having summary reproduction information of a broadcasting station inserted therein according to one embodiment of the present invention.

FIG. 2 is a flowchart of a method of transmitting broadcast data having summary reproduction information of a broadcasting station inserted therein according to one embodiment of the present invention.

Referring to FIG. 1 and FIG. 2, a broadcasting station 110 inserts information for a summary reproduction in broadcast data supposed to be transmitted to a broadcast terminal 120 (S210).

Preferably, the summary reproduction information is an attribute value for setting a level of contents or priority of a scene of the broadcast data.

A process for inserting summary reproduction information by the broadcasting station 110 is explained in detail with reference to FIG. 3 and FIG. 4 as follows.

Figure 3:
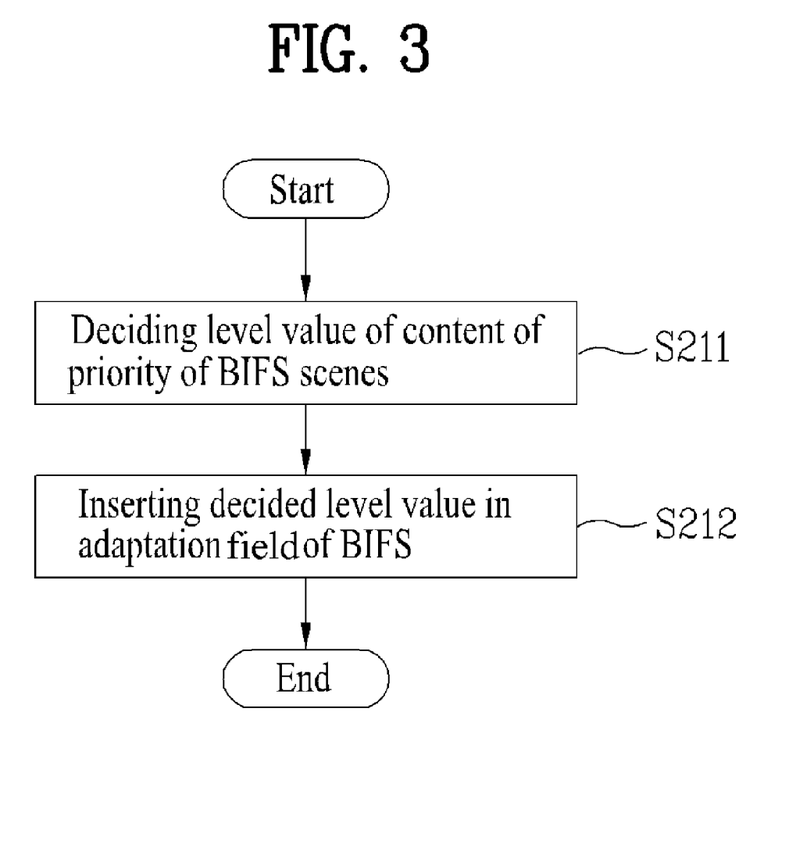
FIG. 3 is a flowchart of a method of inserting summary reproduction information according to one embodiment of the present invention.

FIG. 3 is a flowchart of a method of inserting summary reproduction information according to one embodiment of the present invention.

Figure 4:
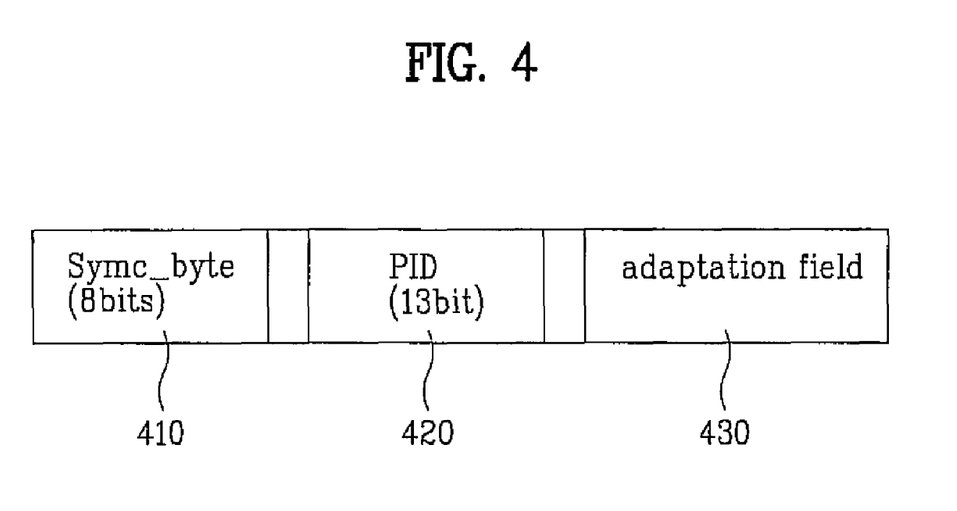
FIG. 4 is a diagram of a structure of broadcast data having summary reproduction information inserted therein according to the present invention.

FIG. 4 is a diagram of a structure of broadcast data having summary reproduction information inserted therein according to the present invention.

Referring to FIG. 3 and FIG. 4, the current MPEG system standard includes BIFS (binary format for scenes) as a scene technique standard for free expression of various multimedia configured by object unit and interactivity with a user.

The BIFS is a binary format for video information.

Each BIFS information is connected to information for a video stream or audio stream via a node link.

The BIFS includes a header and a payload.

The header includes a sync_byte 410, a PID (packet identifier) 420, and an adaptation field 430.

The sync_byte 410 is configured with 8 bits '0100 0111' and is not usable in a periodically repeated part, and more particularly, in a field of the PID 420.

Namely, the broadcast terminal 120 having received the broadcast data initiates demultiplexing by finding the BIFS based on a value of the sync_byte 410.

The PID 420 is configured with 13 bits and used in identifying a type of data included in the payload.

In particular, it is able to transmit PCR information by inserting the PCR (program clock reference) information in a place where a PID value is 0x0000, 0x0001, or 0x0010~0x1FFE. Yet, it is unable to transmit the PCR information if the PID value is 0x1FFF that indicates a null packet.

The adaptation field 430 is a reserved filed in which summary reproduction information for broadcast data according to the present invention is inserted.

So, the broadcasting station 110 decides the values indicating levels of the contents or priority of the BIFS by real time while BIFS broadcast data is encoded (S211).

Subsequently, the broadcasting station 110 inserts the decided level value in the adaptation field 430 (S212).

Thus, the broadcasting station 110, as shown in FIG. 3 and FIG. 4, transmits the broadcast data having the summary reproduction information inserted therein to the broadcast terminal 120 (S220).

A method of transmitting the broadcast data in which the summary reproduction information of the broadcasting station 110 is inserted is explained in detail with reference to Table 1 as follows.

TABLE 1

| Summary reproduction information | | |
|---|---|---|
| Scene-A | contents | Drama (level value: 1) |
| | priority | Level: 5 |
| Scene-B | contents | Drama (level value: 1) |
| | priority | Level: 1 |
| Scene-C | contents | Drama (level value: 1) |
| | Priority | Level: 4 |

Content types of BIFS include drama, comedy, news, movie, and sports. For example, a level value of the drama is 1, a level value of the comedy is 2, a level value of the news is 3, a level value of the movie is 4, and a level value of the sports is 5.

And, it is also assumed that the priority of the BIFS ranges from 1 (lowest level) to 5 (highest level).

In this case, the priority level value 1 is the value indicating a lowest level, the priority level value 3 is the value indicating an intermediate level, and the priority level value 5 is the value indicating a highest level. With reference to '3', '2' indicates a lower level and '4' indicates a higher level.

Referring to Table 1, if contents of A, B and C scenes of the currently encoded BIFS correspond to a drama, the broadcasting station 110 decides each content level value of the A, B and C scenes as '1'.

If a priority of the A scene among the scenes of the drama is a highest level, a priority level value of the A scene is decided as '5'.

If a priority of the B scene among the scenes of the drama is a lowest level, a priority level value of the B scene is decided as '1'.

If a priority of the C scene among the scenes of the drama is a high level, a priority level value of the C scene is decided as '4'.

The broadcasting station 110 inserts the decided content and priority level values of the A, B and C scenes in the adaptation field 430 of the BIFS and then transmits the BIFS to the broadcast terminal 120.

Figure 5:
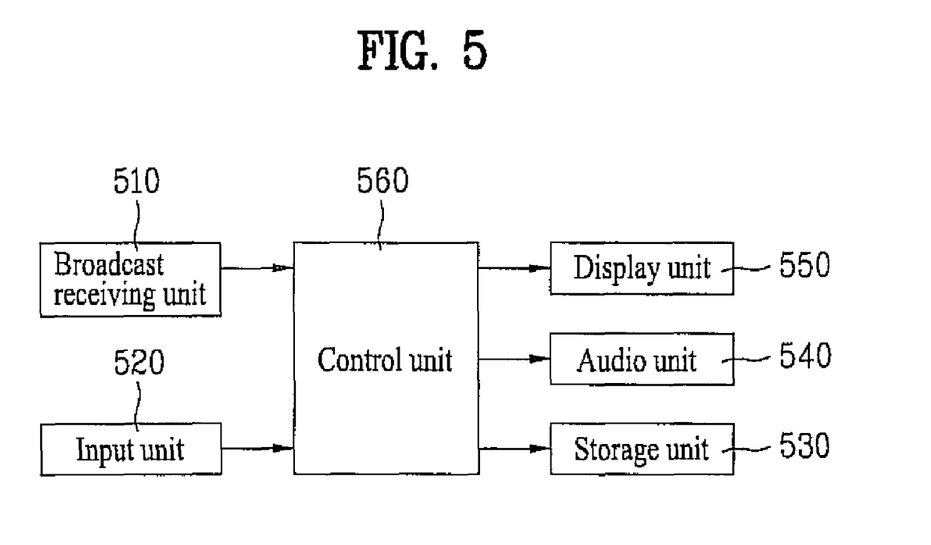
FIG. 5 is a block diagram of a broadcast terminal according to the present invention.

FIG. 5 is a block diagram of a broadcast terminal according to the present invention.

Referring to FIG. 5, a broadcast terminal 120 according to the present invention includes a broadcast receiving unit 510, an input unit 520, a storage unit 530, an audio unit 540, a display unit 550, and a control unit 560.

The broadcast receiving unit 510 receives broadcast data from a broadcasting station and then demultiplexes and decodes the received broadcast data.

And, the broadcast receiving unit 510 receives BIFS broadcast data, in which information for summary reproduction is inserted, from the broadcasting station 110.

The input unit 520 includes a plurality of numeral keys and a plurality of function keys and outputs key signals of the keys to the control unit 560.

Preferably, the input unit 520 includes a touch pad or touchscreen according to a configuration of the broadcast terminal 120.

The storage unit 530 is provided with a program for controlling overall operations of the broadcast terminal 120 and stores various data inputted/outputted in executing a control operation of the broadcast terminal 120.

And, the storage unit 530 stores the broadcast data decoded by the broadcast receiving unit 510 under the control of the control unit 560.

The audio unit 540 outputs an audio signal decoded by the broadcast receiving unit to a speaker under the control of the control unit 560.

The display unit 550 displays a video signal decoded by the broadcast receiving unit 510 under the control of the control unit 560.

In this case, the display unit 550 is able to perform an input function of the input unit 520 by a touch screen system.

And, the control unit 560 controls overall operations of the broadcast terminal 120. A process for setting a summary reproduction condition of the recorded broadcast data in the control unit 560 and a process for reproducing a summary are explained in detail with reference to FIGS. 6 to 7 as follows.

Figure 6A:
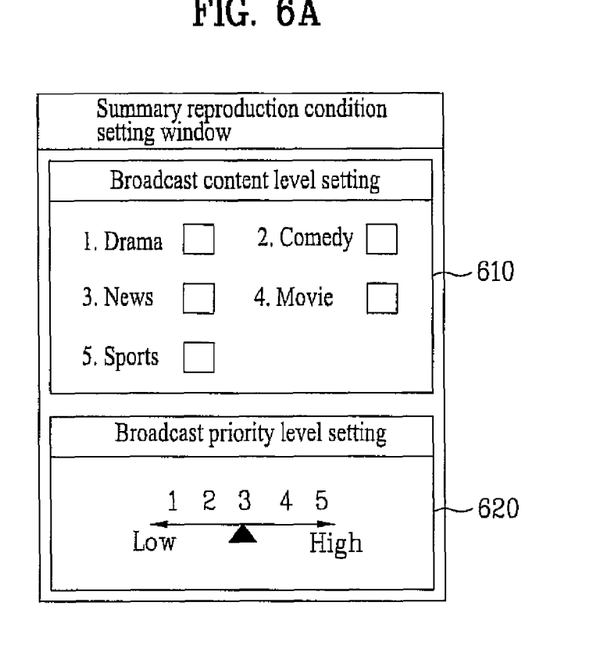
FIGS. 6A to 6C are diagrams to explain a method of setting a summary reproduction condition of broadcast data according to one embodiment of the present invention.
Figure 6B:
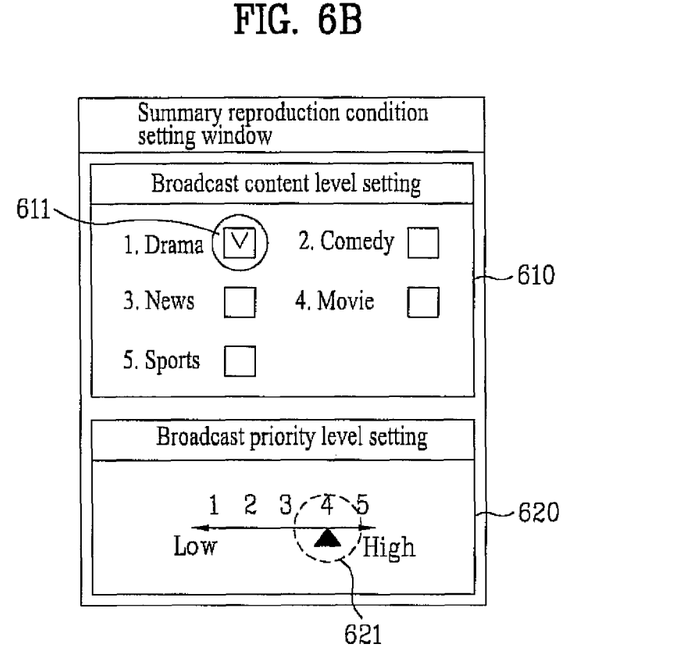
Figure 6C:
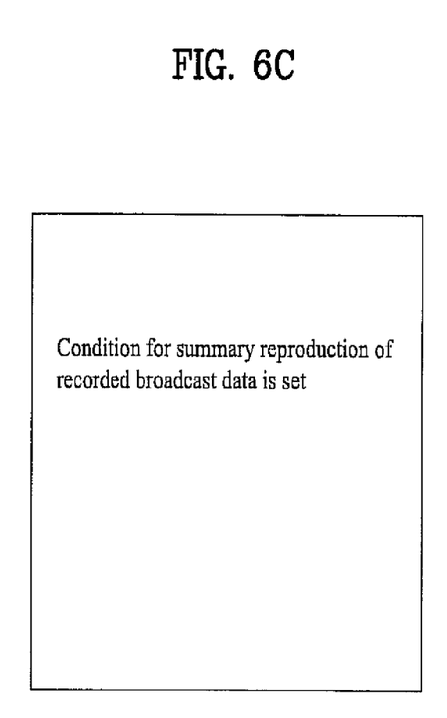

FIGS. 6A to 6C are diagrams to explain a method of setting a summary reproduction condition of broadcast data according to one embodiment of the present invention.

Referring to FIGS. 6A to 6C, if a key signal for setting a summary reproduction condition of recorded broadcast data is inputted by a user via the input unit 520, the control unit 560 displays a window for setting the summary reproduction condition on the display unit 550 shown in FIG. 6A.

In this case, the summary reproduction condition setting window includes a window 610 for setting a content level of the broadcast data and a window 620 for setting a priority level of the broadcast data.

In particular, a user is able to set a broadcast content level of '1. Drama', '2. Comedy', '3. News', '4. Movie', and '5. Sports' shown in FIG. 6A using the content level setting window 610.

And, the user is able to set the priority of the broadcasts shown in FIG. 6A using the priority level setting window 620.

If the user selects '1', the priority of the broadcast is set to a lowest level. If the user selects '3', the priority of the broadcast is set to an intermediate level. If the user selects '5', the priority of the broadcast is set to a highest level. If the user selects '2', the priority of the broadcast is set to a low level. If the user selects '4', the priority of the broadcast is set to a high level.

If the user sets the content level value of the '1. Drama' 611 and the priority level value of the '4. Movie' 621, as shown in FIG. 6B, the control unit 560, as shown in FIG. 6C, stores the set level values in the storage unit 530.

Figure 7:
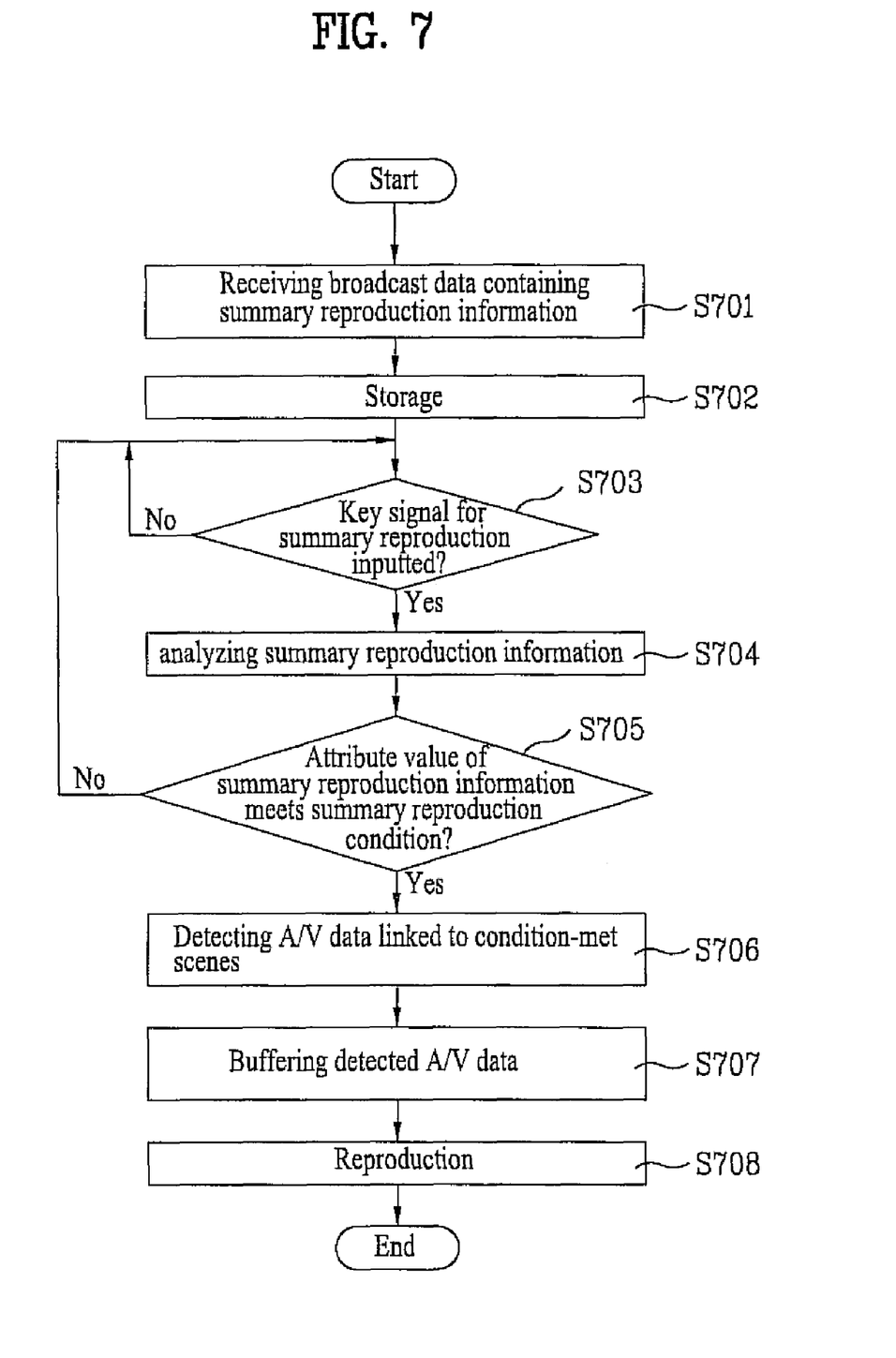
FIG. 7 is a flowchart of a method of reproducing a recorded broadcast data summary in a broadcast terminal according to one embodiment of the present invention.

FIG. 7 is a flowchart of a method of reproducing a recorded broadcast data summary in a broadcast terminal according to one embodiment of the present invention.

Referring to FIG. 7, the control unit 560 receives BIFS broadcast data, in which information for a summary reproduction of recorded broadcast data is inserted, from the broadcasting station via the broadcast receiving unit 510 (S701). The control unit 560 then enables the received BIFS broadcast data in the storage unit 530 (S702).

Subsequently, if a key signal for the summary reproduction of the recorded BIFS broadcast data is inputted by a user via the input unit 520 (S703), the control unit 560 analyzes the stored summary reproduction information (S704).

In this case, the summary reproduction information is inserted in an adaptation field of the BIFS broadcast data.

And, the summary reproduction information includes values indicating levels of contents or priorities of scenes of the BIFS broadcast data as attribute values of the scenes of the BIFS broadcast data.

In particular, the control unit 560 analyzes the level values of the contents and priorities of the scenes included in the summary reproduction information.

The control unit 560 checks whether the analyzed attribute value of the summary reproduction information meets the summary reproduction condition established by the process shown in FIGS. 6A to 6C (S705).

If the condition is met, the control unit 560 detects audio/video data linked to the scenes having met the summary reproduction condition (S706).

The control unit 560 buffers the detected audio/video data (S707) and then reproduces the buffered data via the audio unit 540 and the display unit 550 (S708).

A process for reproducing a summary of recorded broadcast data according to the present invention is explained with reference to Table 1 and FIGS. 6A to 6C as follows.

First of all, it is assumed that content and priority level values of the summary reproduction information scenes analyzed in the step S704 follow Table 1 and it is assumed that the summary reproduction condition in the step S705 is the value shown in FIGS. 6A to 6C.

The control unit 560 checks whether the content levels of the A, B and C scenes shown in Table 1 meet the content level shown in FIG. 6B.

In particular, the content level of the 'drama' is set in FIG. 6B and '1' indicating the level of the 'drama' is inserted for the content levels of the A, B and C scenes in Table 1. Hence, the content levels of the A, B and C scenes meet the content level of the summary reproduction condition.

The control unit 560 detects and reproduces audio/video data linked to the A, B and C scenes having met the content level of the summary reproduction condition.

And, the control unit 560 checks whether the priority levels of the A, B and C scenes meet the priority level shown in FIG. 6B.

In particular, in FIG. 5B, '4' indicating the priority of the high level is set and a highest level '5' is inserted for the priority level of the A scene. Hence, the priority level of the A scene meets the priority level of the summary reproduction condition.

Since a lowest level '1' is inserted for the priority level of the B scene. Hence, the priority level of the B scene fails to meet the priority level of the summary reproduction condition.

Since a high level '4' is inserted for the priority level of the C scene. Hence, the priority level of the C scene meets the priority level of the summary reproduction condition.

The control unit 560 detects and reproduces audio/video data linked to the A and C scenes having met the priority level of the summary reproduction condition.

Accordingly, the present invention provides the following effects or advantages.

First of all, a summary of broadcast data can be effectively reproduced.

In particular, since scenes having met a content or priority level of a broadcast set by a user among a plurality of scenes of the recorded broadcast data are collected for summary reproduction, a summarized broadcast appropriate for a user's level can be produced and reproduced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of reproducing broadcast data by a broadcast terminal, the method comprising:
   receiving and storing the broadcast data containing summary reproduction information from a broadcasting station, wherein the broadcast data is BIFS (binary format for scenes) and the summary reproduction information is inserted into an adaptation field of the BIFS by the broadcasting station;
   analyzing the stored summary reproduction information;
   checking scenes included in the summary reproduction information to determine whether a summary reproduction condition has been met;
   reproducing a summary of the broadcast data using the analyzed summary reproduction information upon detecting scenes that have met the summary reproduction condition; and
   outputting audio data and video data of the reproduced summary that are linked to the detected scenes in the summary reproduction information.

2. The method of claim 1, wherein the summary reproduction information comprises attribute values of scenes in the broadcast data.

3. The method of claim 2, wherein the attribute values indicate levels of contents or priorities of the scenes.

4. The method of claim 2, wherein reproducing the summary comprises:
   checking whether the attribute values included in the analyzed summary reproduction information meet the summary reproduction condition;
   detecting the audio and video data linked to the scene of the broadcast data if the summary reproduction condition is met; and
   reproducing the summary by buffering the detected audio and video data.

5. The method of claim 4, wherein the summary reproduction condition includes a value set by a user for a level of content or priority of the broadcast data.

6. A broadcast terminal, comprising:
   a broadcast receiving unit receiving broadcast data containing summary reproduction information from a broadcasting station, wherein the broadcast data is BIFS (binary format for scenes) and the summary reproduction information is inserted into an adaptation field of the BIFS;
   a storage unit storing the received broadcast data;
   a control unit reproducing a summary of the stored broadcast data using the summary reproduction information upon checking scenes included in the summary reproduction information and detecting scenes that have met a summary reproduction condition;
   an audio unit outputting audio data of the reproduced summary that is linked to the detected scenes in the summary reproduction information; and
   a display unit outputting video data of the reproduced summary that is linked to the detected scenes in the summary reproduction information.

7. The broadcast terminal of claim 6, wherein the control unit analyzes attribute values of the scenes in the broadcast data included in the summary reproduction information.

8. The broadcast terminal of claim 7, wherein the attribute values indicate levels of contents or priorities of the scenes.

9. The broadcast terminal of claim 7, wherein the control unit reproduces the summary of the broadcast data by detecting and buffering the audio and video data linked to the scenes in the broadcast data when the attribute values included in the summary reproduction information meet the summary reproduction condition.

10. The broadcast terminal of claim 9, wherein the summary reproduction condition includes a value set by a user for a level of content or priority of the broadcast data.

11. A broadcast system, comprising:
    a broadcasting station inserting summary reproduction information into broadcast data and transmitting the broadcast data having the summary reproduction information; and
    a broadcast terminal storing the broadcast data received from the broadcasting station, and reproducing a summary of the broadcast data using the summary reproduction information, wherein the broadcast data is BIFS (binary format for scenes) and the summary reproduction information is inserted into an adaptation field of the BIFS.

12. The method of claim 1, further comprising receiving an input for setting the summary reproduction condition.

13. The method of claim 12, further comprising displaying a window for setting the summary reproduction condition on a display unit of the broadcast terminal.

14. The broadcast terminal of claim 6, further comprising an input unit receiving an input for setting the summary reproduction condition.

15. The broadcast terminal of claim 14, wherein the display unit displays a window for setting the summary reproduction condition.

* * * * *